United States Patent [19]  [11] 3,976,444
Kuehl  [45] Aug. 24, 1976

[54] PRODUCTION OF IMPROVED BORON ABRASIVES

[75] Inventor: Donald K. Kuehl, Manchester, Conn.

[73] Assignee: United Technologies Corporation, Hartford, Conn.

[22] Filed: Oct. 25, 1974

[21] Appl. No.: 518,032

[52] U.S. Cl. .................................. 51/307; 51/309 R
[51] Int. Cl.² ........................ B24D 3/04; B24D 3/06
[58] Field of Search ............ 51/309, 308, 307, 295; 117/128; 423/289, 297, 298

[56] References Cited
UNITED STATES PATENTS

| | | | |
|---|---|---|---|
| 2,678,870 | 5/1954 | Cooper | 423/289 |
| 2,735,155 | 2/1956 | Glaser | 423/297 |
| 3,226,248 | 12/1965 | Talley | 117/128 |
| 3,258,316 | 6/1966 | Tepper et al. | 423/297 |
| 3,556,834 | 1/1971 | Gebhardt | 117/128 |
| 3,573,969 | 4/1971 | Camahort et al. | 117/128 |
| 3,574,649 | 4/1971 | Fanti et al. | 117/128 |
| 3,619,152 | 11/1971 | Yalof et al. | 51/295 |

Primary Examiner—Donald J. Arnold
Attorney, Agent, or Firm—John D. Del Ponti

[57] ABSTRACT

A boron abrasive is produced by crystallization of amorphous boron in the presence of and/or admixture with heavy metal borides. Boron filaments may be crystallized by being subjected to elevated temperatures, less than the melting point of boron, prior to shearing into short lengths and grinding into powder. Alternatively, boron in bulk form may be heated above the melting point and seeded with a material which will cause the formation of crystalline borides; the resulting product when cooled including solidified borides and crystalline boron which may be ground to powder.

1 Claim, No Drawings

PRODUCTION OF IMPROVED BORON ABRASIVES

BACKGROUND OF THE INVENTION

1. Field of the Invention

The present invention relates to apparatus and materials employed in grinding and cutting. More specifically, this invention is directed to the manufacture of abrasive materials and particularly to improved boron abrasives. Accordingly, the general objects of the present invention are to provide novel and improved articles and methods of such character.

2. Description of the Prior Art

There is a long standing desire in the art to provide improved low-cost abrasive materials for use as lapping compounds, on sandpaper, on grinding wheels, on cut-off wheels and on abrasive saws. Considering an abrasive saw as an example, standard practice in the art is to utilize cutting surfaces formed of diamond or carbide. The use of diamond or carbide materials, while resulting in tools which efficiently perform the desired cutting function, results in comparatively expensive tools which are characterized by a relatively short life.

It is well known that elemental boron, because of its unique physical properties, affords the potential of providing cutting tools of lower cost and greater life expectancy than, for example, tools which utilize a carbide cutting surface. Thus, by way of example, U.S. Pat. No. 3,619,152 suggests the employment of chopped filaments of amorphous boron in the formation of saw blanks. While elemental or amorphous boron is softer than diamond it is of comparable hardness or harder than available carbides. Amorphous boron is also considerably less expensive than diamond dust. Crystallized boron is one of the hardest materials available; beta-tetragonal and beta-rhombohodral boron being much harder than amorphous boron. Also of considerable significance is the fact that crystalline boron, when fractured, is characterized by sharp edges thus making this material more abrasive than other materials of comparable hardness.

Techniques for the production of monocrystalline or polycrystalline boron in an efficient and thus comparatively inexpensive manner have not been available in the prior art. Thus, again by way of example only, U.S Pat. No. 3,226,248 depicts a typical prior art technique for the production of monocrystalline boron. The process of Pat. No. 3,226,248 employs zone melting, controlled through the use of electron beam bombardment, and cannot be economically practiced on a commercial scale.

SUMMARY OF THE INVENTION

The present invention overcomes the above briefly discussed and other deficiencies and disadvantages of the prior art by providing a novel and improved technique for the formation of crystalline boron having particular utility for use as an abrasive. In accordance with a first embodiment of the invention boron filaments, which consist of amorphous boron deposited on a tungsten wire substrate, are crystallized by heating in a suitable atmosphere to a temperature in excess of 1300°C but less than the melting temperature of the boron. Thereafter, the crystallized boron filaments are cut and ground to a powder which is bonded to a cutting tool base. Alternatively, elemental boron in liquid form is seeded with a material which causes the formation of borides. Crystalline boron containing disbursed crystalline borides are formed upon removal of heat and the crystallized material may thereafter be ground to powder and bonded to a substrate.

DESCRIPTION OF THe PREFERRED EMBODIMENTS

Considering first the embodiment of the invention which employs boron filaments as the raw material, it will be understood that such filaments are produced using a tungsten wire substrate and the known $BCl_3$-$H_2$ process. In this process, for example as disclosed in U.S Pat. No. 3,549,424, a complex flow of $BCl_3$ and $H_2$ gas is established along a vertically oriented, multistage, glass reactor which encloses the tungsten substrate; the substrate being heated resistively. The chemical reaction within the tube results in the deposition of amorphous boron on the filament, the production of HCl and the conversion of the substrate to tungsten boride.

In accordance with the present invention boron filaments produced in the manner briefly described above are heated, in a gaseous atmosphere, to a temperature above 1300°C but less than the approximately 2300°C melting temperature of the boron to crystallize the boron. The crystallization is performed in a gaseous atmosphere, for example in $H_2$ or an inert atmosphere such as argon or nitrogen, and the duration of the heating step will be inversely proportional to the temperature. If it is desired to obtain $\beta$-tetragonal crystalline boron the temperature will be in the range of 1300°C to 1480°C. If the $\beta$-rhombohedral form of crystallized boron is to be formed the temperature will be in the range of 1480°C to 2300°C.

After the amorphous filamentary boron has been converted into crystalline form the boron filaments will be chopped into short lengths and thereafter ground or milled to powder. This grinding may be performed within a ball mill.

In one example a plurality of amorphous boron filaments, produced by chemical vapor disposition from $BCl_3$ on a tungsten wire substrate, were heated for two hours in a gaseous atmosphere, either argon, helium or hydrogen, at a temperature of 1400°C. The heating step resulted in conversion of the amorphous boron to crystalline form. The thus converted boron filaments were removed from the furnace and cut, by means of shearing action, into pieces of one-half to one inch average length. The chopped boron filaments were thereafter fed into a ball mill and ground. The boron abrasive material resulting from the grinding step was thereafter applied to a cutting tool blank, for example a grinding wheel comprised of a silver matrix on a steel core.

It is to be noted that the step of crystallizing the amorphous boron by heating may be performed in the atmosphere if commercially available "Borsic" filaments are employed. The Borsic filaments are high-quality boron filaments that have been coated with silicon carbide. The silicon carbide coating is a diffusion barrier that prevents reaction between boron and other materials. The Borsic filaments are available in 4.2 mil and 5.7 mil nominal diameter from Composite Materials Corporation, Broad Brook, Conn. Other than permitting heating in the ambient atmosphere, the process, including the times and temperatures, will be the same with the use of boron and Borsic filaments. The presence of carbides, such as silicon carbide, incident to the use of Borsic filaments enhances the abrasive action of the resulting boron abrasive powder.

In accordance with a second embodiment of the invention, molten elemental boron may be seeded with a material which will cause the formation of borides. Thus, by way of example, the molten boron may be seeded with 1-10% tungsten by weight to produce tungsten boride mixed with the crystalline boron. The tungsten boride and crystalline boron are permitted to solidify and thereafter reduced to powder by grinding or milling. Since borides have a higher melting point than boron, the tungsten borides will solidify first and will thus be evenly distributed throughout the crystallized boron. Other materials suitable for seeding molten boron include molybdenum, tantalum and similar metals which form crystalline borides. In the practice of the invention elemental boron is placed in a boron nitride crucible and heated to a temperature above 2300°C with an induction coil using a graphite or titanium nitride susceptor. The seed crystals of the selected material are dropped into the molten boron and the heat is reduced. The solidified borides and $\beta$-rhombohedral boron which remain after cooling, when ground to powder, have enhanced abrasive qualities when compared to amorphous boron.

While preferred embodiments have been described, various modifications and substitutions may be made thereto without departing from the spirit and scope of the present invention. Thus, by way of example, materials other than tungsten may be employed as a substrate for producing boron filaments; the choice of material being in part determined by whether the developed boride form enhances the abrasive qualities of the ultimately produced boron powder. Thus, it will be understood that the present invention contemplates the crystallization of boron in the presence of and/or admixture with heavy metal borides to produce a material with superior abrasive properties. Similarly, while use of the boron grinding powder of the present invention on a substrate to form a cutting tool has been discussed, the powder could also be mixed with a carrier for use in polishing. Accordingly, it is to be understood that the present invention has been described by way of illustration and not limitation.

What is claimed is:

1. A method for the production of an abrasive material comprising the steps of:

heating elemental boron to a temperature above its melting point;

seeding the molten boron with 1-10% by weight seed crystals of an elemental metal selected from the group consisting of W, Mo and Ta to form crystalline borides thereof; and cooling the mixture to cause formations of beta-rhombohedral boron with solidified borides distributed therein.

* * * * *